United States Patent
Double et al.

(10) Patent No.: US 6,474,022 B1
(45) Date of Patent: Nov. 5, 2002

(54) MULTI-PURPOSE TARPAULIN SYSTEM

(75) Inventors: Paul B. Double, Winona, MN (US); Robert E. Dotterwick, Fountain City, WI (US); Jerry N. Ehlenfeldt, Lewiston, MN (US); Leslie J Davidshofer, Winona, MN (US)

(73) Assignee: Canamer International, Inc., Winona, MN (US)

( * ) Notice: Subject to any disclaimer, the term of this patent is extended or adjusted under 35 U.S.C. 154(b) by 197 days.

(21) Appl. No.: 09/702,377

(22) Filed: Oct. 31, 2000

(51) Int. Cl.⁷ .............................. E04B 1/34; E04M 15/54
(52) U.S. Cl. .............................. 52/3; 428/124; 428/125; 428/130; 428/152; 428/181; 135/115
(58) Field of Search .......................... 135/115; 428/181, 428/124, 125, 130, 152; 156/304.1

(56) References Cited

U.S. PATENT DOCUMENTS

| | | |
|---|---|---|
| 3,614,154 A | 10/1971 | Evans |
| 3,949,527 A | 4/1976 | Double et al. |
| 4,413,029 A | 11/1983 | Handwerker |
| 4,454,807 A | 6/1984 | Wolstensholme |
| 4,455,790 A | 6/1984 | Curle |
| 4,493,248 A | 1/1985 | Wolstenholme |
| 4,590,715 A | 5/1986 | Pandell |
| 4,627,333 A | 12/1986 | Anderson et al. |
| 4,660,337 A | 4/1987 | Ross, III et al. |
| RE32,536 E | 11/1987 | Wolstenholme |
| 4,726,286 A | 2/1988 | Anderson et al. |
| 4,897,970 A | 2/1990 | Double et al. |
| 5,050,924 A | 9/1991 | Hansen |
| 5,240,756 A | 8/1993 | Finell et al. |
| 5,291,698 A | 3/1994 | Rayner, Jr. |
| 5,363,605 A | 11/1994 | Handwerker |
| 5,974,740 A | 11/1999 | Park |

FOREIGN PATENT DOCUMENTS

CA    1036457    8/1978

*Primary Examiner*—Terrel Morris
*Assistant Examiner*—Alexis Wachtel
(74) *Attorney, Agent, or Firm*—Moore & Hansen

(57) ABSTRACT

A weather resistant commodity stockpile and collection pond covering system made up of a plurality of sheets joined together in waterproof seams. A plurality of flexible cords are tightly encapsulated and fixed in each sheet at spaced apart locations within thermally welded prayer seams and utilized for retention of the cover system and the hanging of ballast bags. The peeling stresses on the prayer seams are transferred as shearing stresses to lap seams formed by welding choker strips to the cover sheets on either side of each prayer seam. Side cords encapsulated in edge seams along side edges of adjacent sheets are abutted together and secured by flexible ties to form joints between sheets. Those joints are made waterproof by edge flaps attached to the sheets which are extended over each joint and sealed to the face of an adjoining sheet.

19 Claims, 11 Drawing Sheets

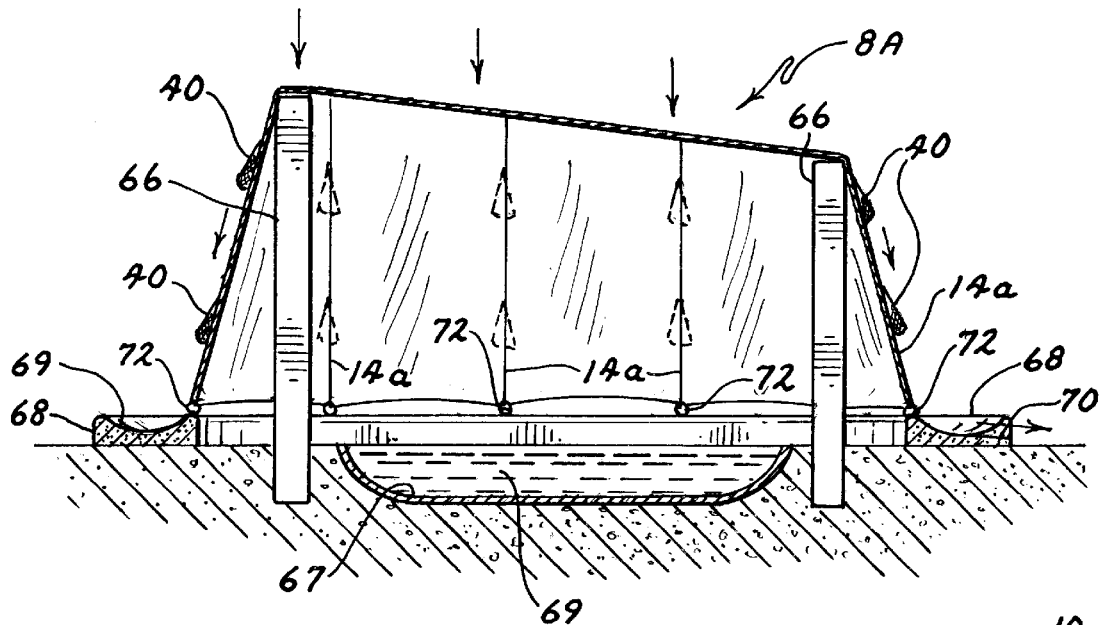
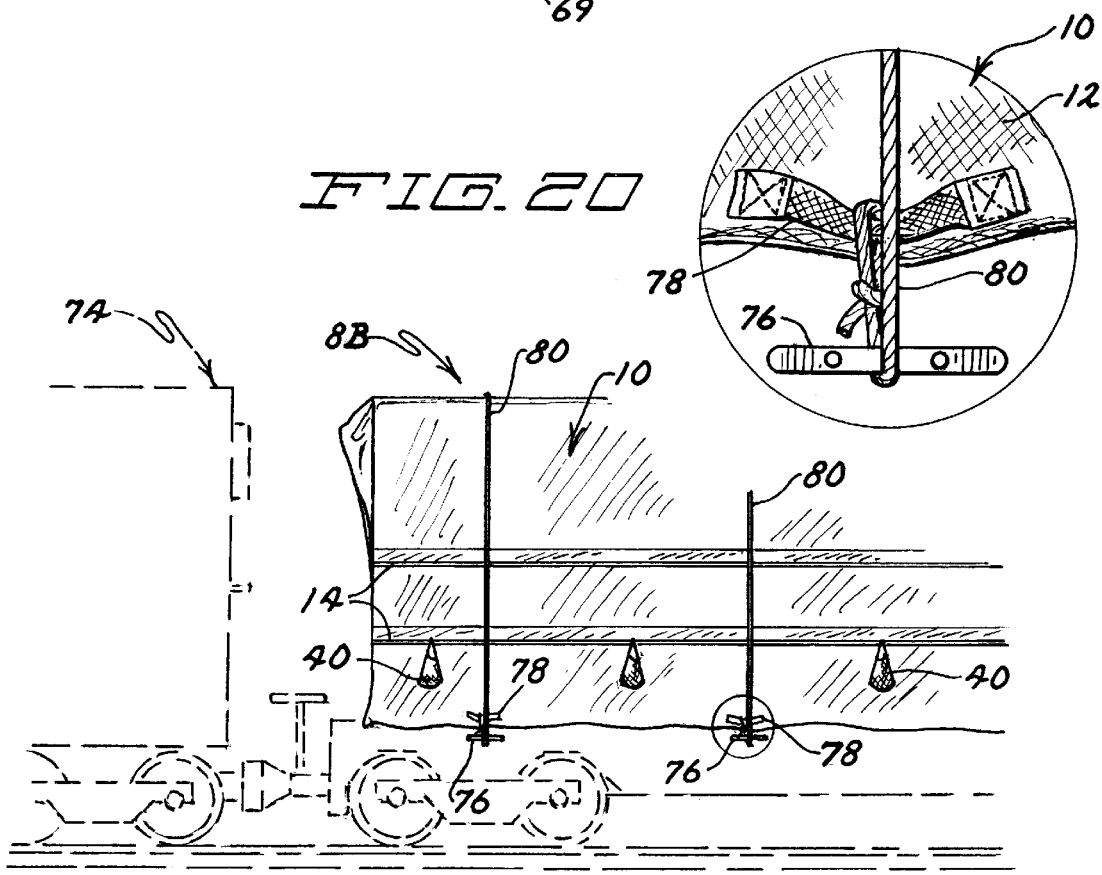

MULTI-PURPOSE TARPAULIN SYSTEM

BACKGROUND OF THE INVENTION

Tarpaulins, or "tarps" as they are commonly called, are used mainly as covers to protect material from moisture. However, as tarps have evolved from canvas to treated canvas to the reinforced polyvinyl tarps found today, their uses have increased dramatically. The versatility of any given tarp is usually limited only by its size, shape, and the number and location of attachment points so that the tarp can be secured.

One common application for large tarpaulin covers is the protection of large stockpiles of materials susceptible to water damage or being blown by wind. Examples include grains, salt, sand, and the like. It is not uncommon for large scale operations to store these commodities in stockpiles spanning several acres reaching heights of fifty feet to one hundred feet. Efforts to develop a tarpaulin cover system to protect a pile of this magnitude have been plagued with problems.

One such cover system, described in U.S. Pat. No. 3,949,527, used a network of tires and cables to secure large covers to the surface of a pile. The tires served to separate the cables from the cover. The network worked well to secure the cover and the tires protected the tarp from the cables, thereby leaving the watertight integrity of the cover intact. However, the tires would collect water. Given the mammoth proportions of these covers, the standing water collected by the tires produced concerns about health hazards such as encephalitis and other mosquito-related problems.

Another system, described in U.S. Pat. No. 4,879,970, used one or more covers, having webbing sewn into the cover material, and ground anchors to hold the cover down. A system using this method of anchoring was referred to as a "banded" system. Alternatively, bags of ballast material could be hung from the webbing to secure the cover. A system using this method of anchoring was referred to as a "ballast" system. Providing the two securing methods was a great advantage over the prior system. However, the webbing presented problems with keeping the covered material dry. Water would work its way through the webbing stitching, especially when the ballast bags were hung from the webbing, or when standing water formed on the top of a pile.

Maintaining a watertight cover over most materials is of paramount importance. Salt is an example of such a material. Salt is stored in huge piles. If standing water develops on top of such a pile, and a leak develops, the salt under the cover dissolves as it gets wet. This causes a dent in the top of the pile to form, thereby creating a place for more water to collect, perpetuating the leak, and increasing the size of the dent. It is not uncommon to lose on the order of fifty thousand cubic feet of salt due to a seemingly small, benign leak. As property values increase, such piles are being reshaped to take up less space, resulting in higher piles. Higher piles are more susceptible to large losses due to water infiltration.

Another problem with these, and many other tarpaulin systems having bands used for either banding or ballasting, is planning and installing the system so that the bands end up being properly oriented. In the case of a banded system, the bands must run generally vertically so that the ends of the bands may be anchored to create a downward force on the cover. A typical pile has a somewhat rectangular or racetrack shaped base. Positioning a tarp over the pile so the bands run vertically on the longer sides results in horizontal banding at the ends. To secure the ends, the tarp must be folded strategically to produce banding at the ends with at least some vertical component. Alternatively, the tarp may customized with multidirectional banding suited to each individual pile.

Customized tarps present yet another problem. After the protected commodity is distributed and consumed, the tarp owner is left with a great deal of material which was designed specifically for a pile which no longer exists. Though tarp material, in general, is useful and versatile, the irregular, custom-designed banding rarely lends itself to a variety of uses other than covering; the pile for which it was designed.

There is a need for a tarpaulin system that is strong, watertight, versatile and reusable.

SUMMARY OF THE INVENTION

The present invention relates to a tarpaulin system incorporating a plurality of reinforcing cords and durable, waterproof seams. As will become readily evident, the extreme versatility of the present invention is of such breadth that the number of uses for such a system is limited only by the imagination of the user.

The tarpaulin system of the present invention is comprised of a synthetic, waterproof material such as coated or laminated reinforced vinyl, polyvinyl, polyethylene, polypropylene, Hypalon®, a chlorosulfonated polyethylene (CSPE)-based synthetic rubber developed by DuPont®, or any such suitable waterproof synthetic material which is heat reactive and thus capable of being heat welded or bonded. Preferably, the material chosen comprises a woven polyester reinforcing scrim with either a coating or thermally bonded outer layer of one of the aforesaid plastic or rubber materials.

The aforementioned reinforcing cords may be natural rope but are preferably synthetic rope material such as polyethylene, polypropylene, polyester, and nylon or an aramid fiber like Kevlar®, made by DuPont®. The reinforcing cords are preferably folded into the material and tightly encapsulated and sealed therein by thermally welding the opposed fold sections together around the cords. This advantageously permits the transfer of stress loads from the cover fabric to the cords.

Heat welding is the preferred method of joining two pieces of the sheet material of the present invention together. Heat welding is the process of subjecting two pieces of the material to an elevated temperature sufficient to melt the outer layer of the material and subsequently pressing the two pieces together, thereby creating a bond as the pieces cool. Heat welding is advantageous because it bonds the two pieces together without puncturing, or otherwise breaching the watertight integrity of the material, unlike stitching or similar joining methods.

Heat welding results in a bond which is characterized by a high resistance to separation when subjected to stresses coplanar with the bond. Seams formed in the cover of the present invention that are oriented such that stresses will necessarily be relatively coplanar with the bond are herein referred to as "lap seams" or "lap welds". FIG. 5 shows an example of a lap seam.

Heat welded bonds or seams on laminate or coating reinforced cover fabrics are only as strong as the adhesion of the laminate or coating to the scrim sheet, commonly referred to as the peel strength. When the two welded pieces are pulled away from each other using forces perpendicular to the plane of the bond in a peeling action, that peel strength is relatively low. Seams formed in the cover of the present invention that are oriented such that stresses will necessarily be relatively perpendicular to the bond are herein referred to as "prayer seams". FIG. 6 shows an example of a prayer seam.

Prayer seams are used in the present invention to envelop the reinforcing cord. Because the orientation of the cord is such that any forces the cord encounters will be in a direction away from or parallel to the seam, the prayer seam just needs to be strong enough to restrain the cord so that it does not become separated from the tarp.

However, the material will be subjected to forces easily capable of separating the prayer seam. To prevent this separation, the present invention preferably uses chokers or choker strips, when necessary, which transfer these forces to lap seams. The shear strength of a lap seam is directly proportionate to the width of the lap seam. This is because a lap seam, when subject to stress, distributes the stress over the entire area of the seam. Therefore, it is important to make a lap seam wide enough to support foreseeable stresses. Prayer seams, on the other hand, focus all of the stresses they are subject to, on the extreme edge of the seam in a peeling action. As the seam peels apart, the stresses are redirected to wherever the edge still intact is located. It follows that the strength of a prayer seam is independent of its width. As is hereinafter set forth in the description of the seaming method and structure, the seam stress is reoriented from a peeling action to a shear force on the choker strip lap joints.

By encapsulating the reinforcing cords into the body of the cover in a thermally welded fold seam of the cover, and strengthening that seam by a thermally welded choker strip, the strength of the cover is enhanced and stresses on it are relieved.

Preferably, the prayer seams used to envelop the cords are wide enough, and the chokers used to support them are of an appropriate width, to permit secondary uses for the cords and prayer seams. For instance, wide prayer seams result in significant parallel folds running the length of the tarp seams. If the tarp is placed on the pile such that these folds run horizontally, a fold could be attached to the adjacent fold above it by simply using plastic ties or ropes, thereby creating a trough for catching and directing rain water off of the pile. These troughs could also be used to carry pipes and pumping systems for directing rain water off of the pile and pumping it to a remote location.

It is envisioned that, due to its versatility, the present tarpaulin system herein described could be used to cover objects other than piles without significant modifications to the tarp itself. For instance, it is often desirable to cover waste ponds in order to control the odors and gases emitted therefrom and also to prevent excess rain water from mixing with the contents of the pond, thereby causing it to overflow and pollute the surrounding areas.

By erecting at least one, preferably two or more frames around the pond, the tarp could be placed over the pond at such a height as to provide a slope from a highest point at the top of one of the frames, to the ground around the perimeter of the pond. A fresh water channel surrounding the perimeter collects the fresh water and directs it to an acceptable location. The troughs of the tarp, described above, assist in directing the rain water from the tarp to the channel. A vent in the top of the tarp is used, preferably in connection with a duct, for venting the undesirable gasses away from the pond to an appropriate area.

It is also contemplated that the tarp may be placed flat over: a pond with freely extending ends of the aforesaid cords attached to anchoring devices, such as posts. With the cords thus tensioned, the seam folds in which they are tightly encapsulated will be caused to stand upright. Water collecting troughs are thus formed between adjacent cord fold sections.

These and other objectives and advantages of the invention will appear more fully from the following description, made in conjunction with the accompanying drawings wherein like reference characters refer to the same or similar parts throughout the several views. And, although the disclosure hereof is detailed and exact to enable those skilled in the art to practice the invention, the physical embodiments herein disclosed merely exemplify the invention which may be embodied in other specific structures. While the preferred embodiments have been described, the details may be changed without departing from the invention, which is defined by the claims.

DESCRIPTION OF THE DRAWINGS

FIG. 18 is a side elevational view illustrating the use for the present invention in covering a body of liquid;

FIG. 19 is a side elevational view of an envisioned use for the present invention in covering an open top hopper car; and FIG. 20 is a detailed view of a fastening arrangement for use on the embodiment of the present invention shown in FIG. 19.

DETAILED DESCRIPTION

Figure 1:
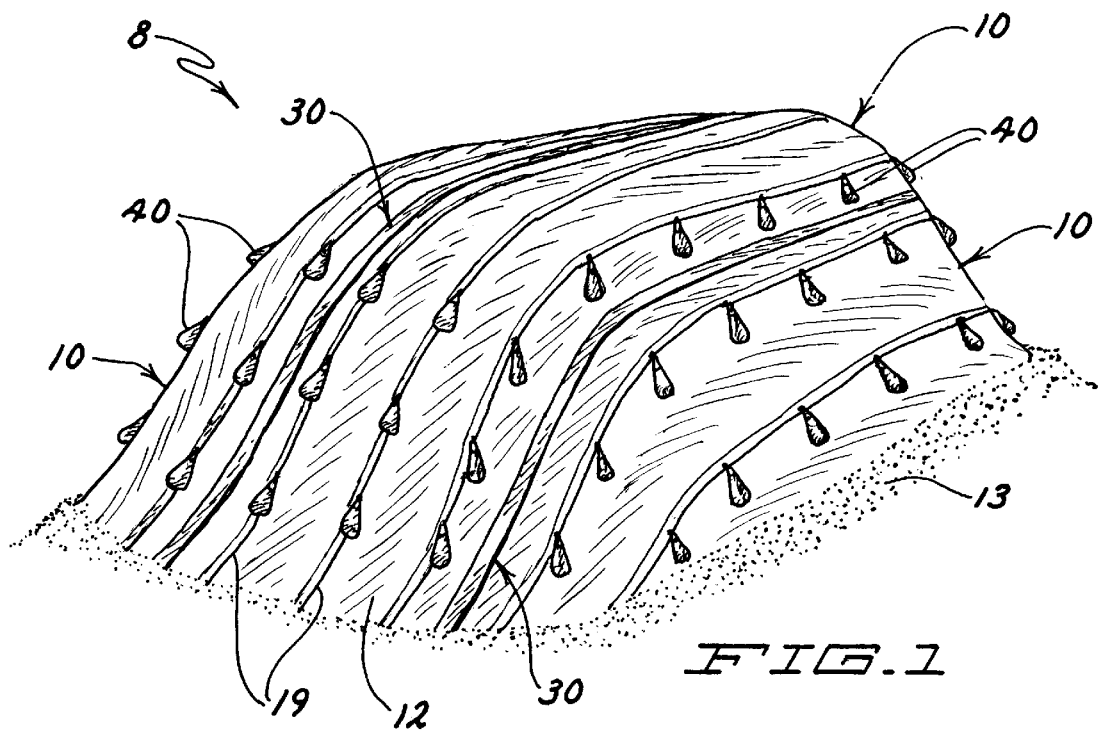
FIG. 1 is a perspective view of an embodiment of the present invention in use covering a pile.
Figure 1A:
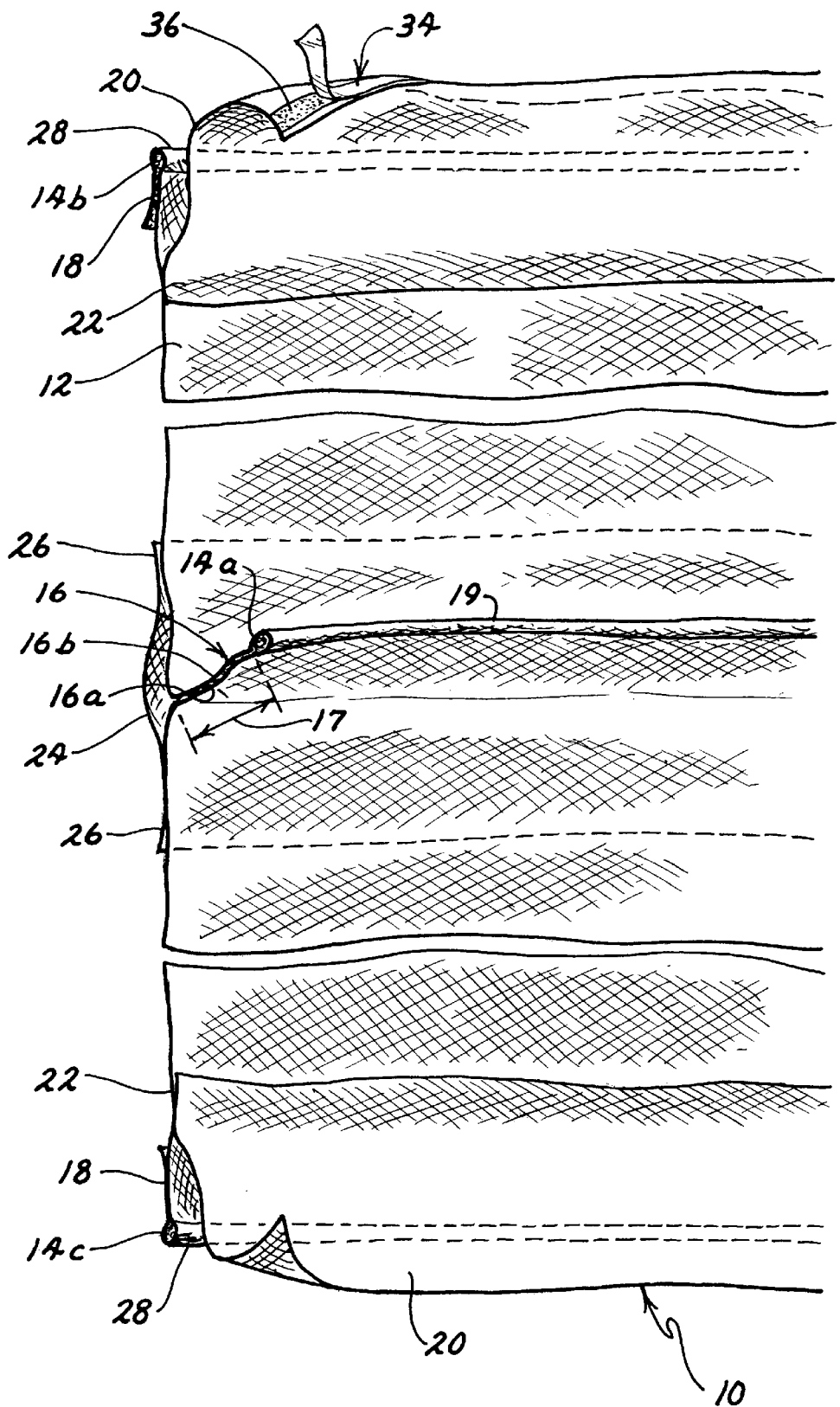
FIG. 1A is a perspective view, on an enlarged scale, of a portion of the cover of FIG. 1 showing a reinforcing cord.

Referring now to FIGS. 1 and 1A, there is shown a cover system 8 comprised of a plurality of tarpaulin sheets 10 of the present invention. Each sheet 10 comprises a flexible, synthetic base 12 which is weather resistant, preferably water resistant, and more preferably waterproof. Base 12 is preferably made of waterproof material such as laminated or coated reinforced vinyl, polyvinyl, polyethylene, polypropylene, Hypalon®, a chlorosulfonated polyethylene (CSPE)-based synthetic rubber developed by DuPont®, or any such suitable waterproof synthetic material capable of being heat welded or bonded. Preferably, the material chosen comprises a woven polyolefin such as polyethylene, polypropylene, nylon, or polyester reinforcing scrim to which an outer layer of one of the aforesaid plastic materials is applied by coating or as a laminate. When applied as a laminate, the outer layer is thermally bonded to the reinforcing scrim in a heat welding process.

Sheet 10 further comprises one or more flexible reinforcing cords 14 thermally encapsulated therein. Cords 14 may be any suitable, flexible cord but are preferably synthetic rope material such as nylon or an aramid fiber like Kevlar®, made by DuPont®. Preferably, each sheet 10 comprises at least three flexible cords 14a, 14b and 14c as shown in FIG. 1a. Cords 14b and 14c are hereinafter referred to as side cords 14b and 14c. The spacing between cords 14 is arbitrary, but preferably may be on the order of 12 feet.

One or more cords 14a run between side cords 14b and 14c and are hereinafter referred to as mid cords 14a. The number of mid cords. 14a between any two given side cords 14b and 14c is variable and customizable depending on the use intended for the sheet 10.

Base 12 is folded around mid cord 14a and heat welded to form prayer seam 16. Prayer seam 16 functions to hold cord 14a in place and is of sufficient width 17 to accept holes 27 punched through seam 16, preferably greater than ¼ inch, more preferably on the order of at least 1 to 2 inches and possibly of much greater width. This welding process preferably comprises the application of heat and pressure to the prayer seam, causing the confronting surfaces 16a and 16b of base 12 material to melt and fuse together, thereby forming prayer seam 16 upon cooling. The material of base sheet 12 is tightly folded and bunched against cord 14a so as to form an elongated sleeve 19 in which cord 14a is tightly encapsulated into the body of sheets 10. A friction fit bond is thus created between cords 14a and thermally welded sheet segments 16a and 16b of base material 12. Cords 14a are thus restrained against any movement which might abrade base sheets 12.

Similarly, as shown in FIG. 1A, base 12 is folded around side cords 14b and 14c, near the side edges 28 of base 12, to encapsulate the cords therein. Base 12 is then heat welded to itself to form edge seams 18. Preferably, some sheets 10 further comprise side flaps 20. Side flaps 20 function to provide a water resistant cover over the union 30 (see FIGS. 9–11) of the side cord 14b with the side cord 14c of an adjacent sheet 10. Side flaps 20 are preferably thermally welded to base 12 proximate side cords 14b and 14c to form side seams 22.

Figure 3:
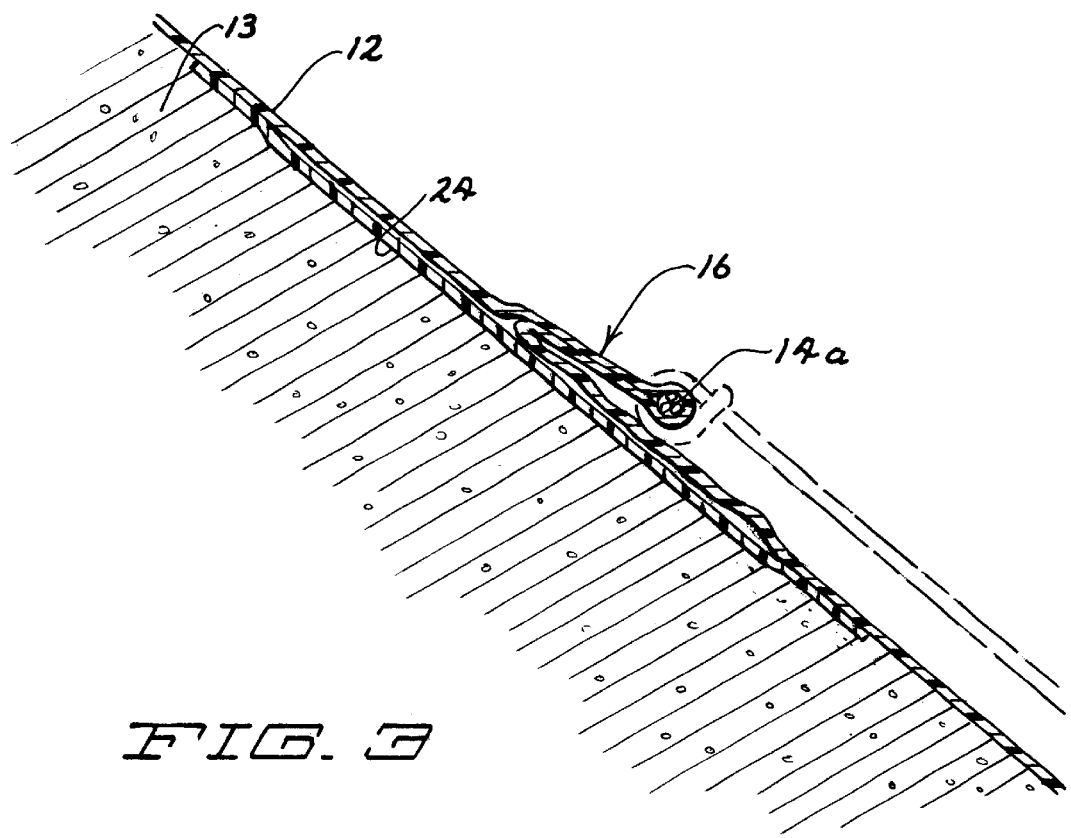
FIG. 3 is a cross section taken generally along lines 3—3 of FIG. 2.
Figure 4:
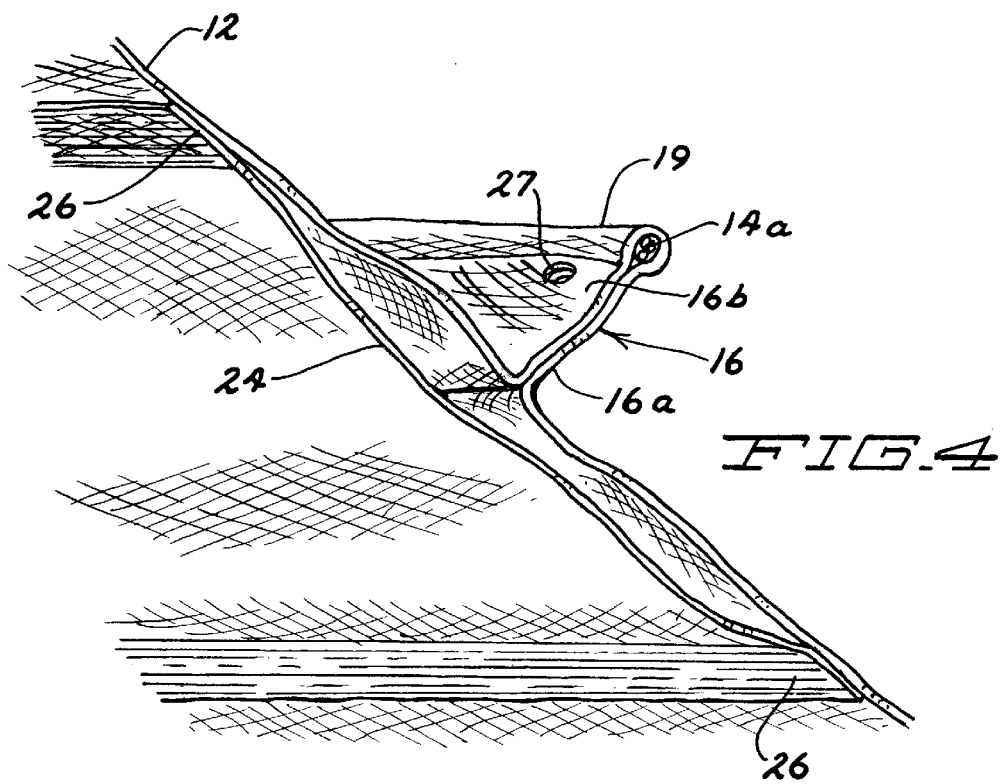
FIG. 4 is a side perspective detailed view of the present invention showing the construction of a preferred embodiment of a reinforcing cord with a prayer seam and a choker.
Figure 5:
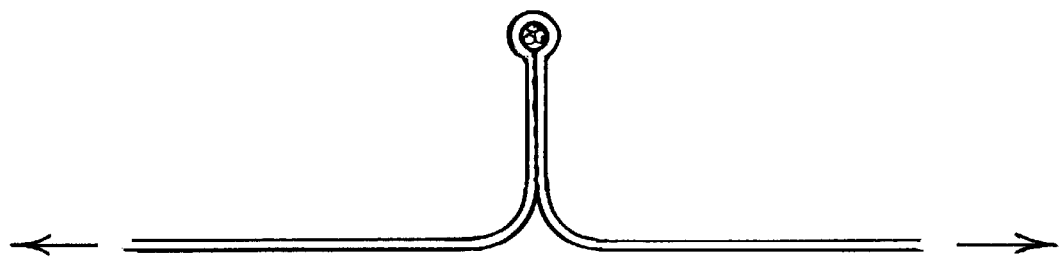
FIG. 5 is an elevational view of a lap seam, as defined herein.
Figure 6:
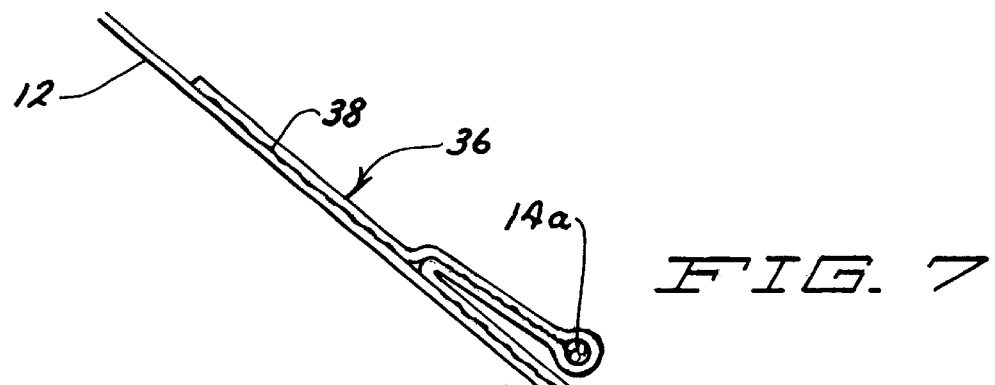
FIG. 6 is an elevational view of a prayer seam, as defined herein.

As seen in FIGS. 1a, 3 and 4, in order to protect prayer seams 16 from separating when subjected to forces on base 12 which have opposing vector components oriented to pull prayer seam 16 apart, as depicted in FIG. 6, chokers 24 are applied to base 12 of sheet segments 10 beneath prayer seams 16. Choker 24 is a strip of material, preferably base 12 material, which is thermally welded to base 12 on either side of prayer seam 16, forming lap seams 26. Preferably, to completely alleviate prayer seam 16 from stress, lap seams 26 are located to ensure that when stress is applied to base 12, choker 24 becomes taut before prayer seam 16 feels stress. In other words, slack exists in the material 12 immediately proximate prayer seam 16, even when choker 24 is taut and lap seams 26 are under stress. FIG. 3 shows a reinforcing cord 14a supporting a load. Choker 24 is taut while slack still exists in base material 12 proximate the downhill side of prayer seam 16. FIG. 4 shows a relaxed prayer seam 16 with a choker 24. By reorienting the stresses on prayer seams 16 from a peeling action tending to peel apart seam flap sections 16a and 16b to a shearing action on lap seams 26, seam joint strength is increased to equal or exceed the strength of cover sheets 10.

An envisioned use for cords 14a is shown in FIGS. 1, 2, 16, 18 and 19. Ballast bags 40 may be filled on site with the granular material being covered and are used to weigh down the system 8. This prevents system 8 from becoming displaced due to wind or other external forces. Preferably, ballast bags 40 are tied around cords 14a using ropes 42. There are many ways to attach a weight to a mid cord 14a and alternatives to using rope would become readily apparent to those skilled in the art. In order to tie rope 42 around cord 14a, a hole 27 is punched with an awl through fold segments 16a and 16b of prayer seam 16 as shown in FIG. 4.

Figure 7:
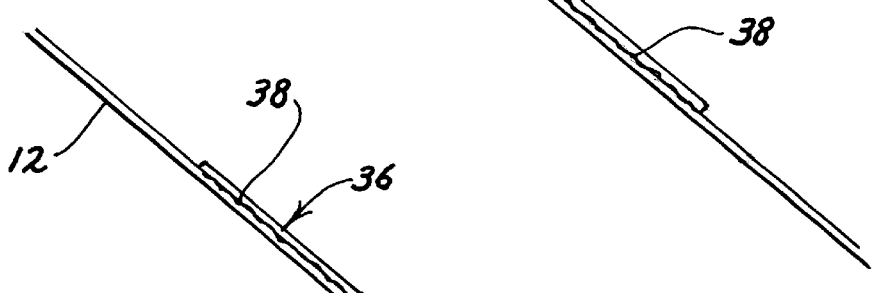
FIG. 7 is a side elevational view of a preferred embodiment of a prayer seam reinforced by a choker.
Figure 8:
FIG. 8 is a side elevational view of an alternative construction of a reinforcing cord assembly.

FIGS. 7 and 8 depict alternative embodiments of midcords 14a. FIG. 7 shows a mid-cord 14a enveloped in a separate strip 36 of material 12. There is sufficient material on either side of cord 14a to allow seams 38 to be formed, preferably by thermal welding. Alternatively, as shown in FIG. 8, it is envisioned that excess material is left only on an uphill side of cord 14a to form a seam 38. This embodiment, however, requires proper orientation of sheet 10 on a pile to ensure seam 38 is on the uphill side of cord 14a.

Figure 9:
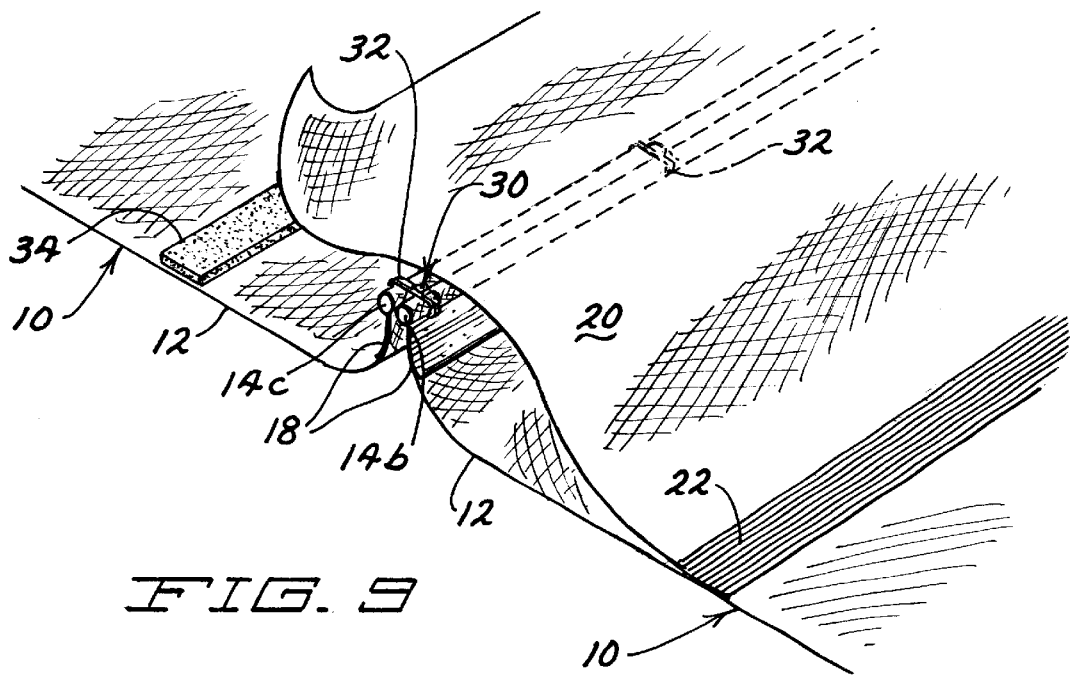
FIG. 9 is a perspective view of an embodiment of a cover sheet union of the present invention.
Figure 10:
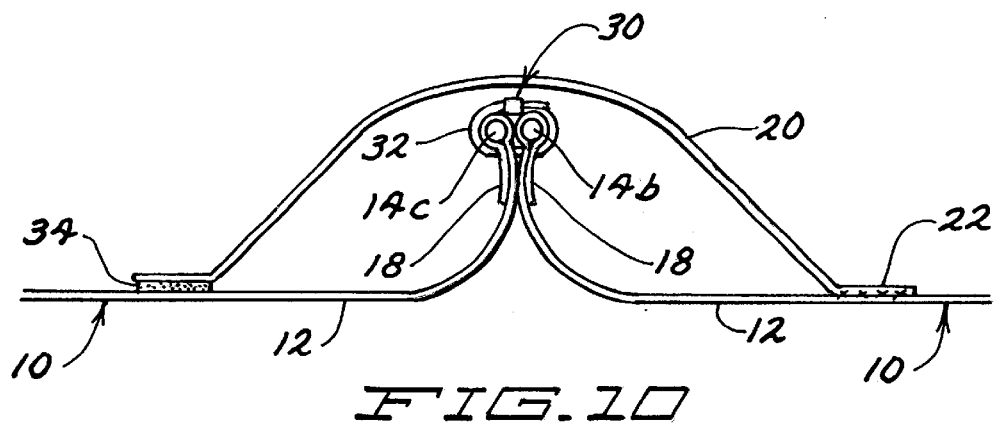
FIG. 10 is a side elevational view of the embodiment of a union shown in FIG. 9.
Figure 11:
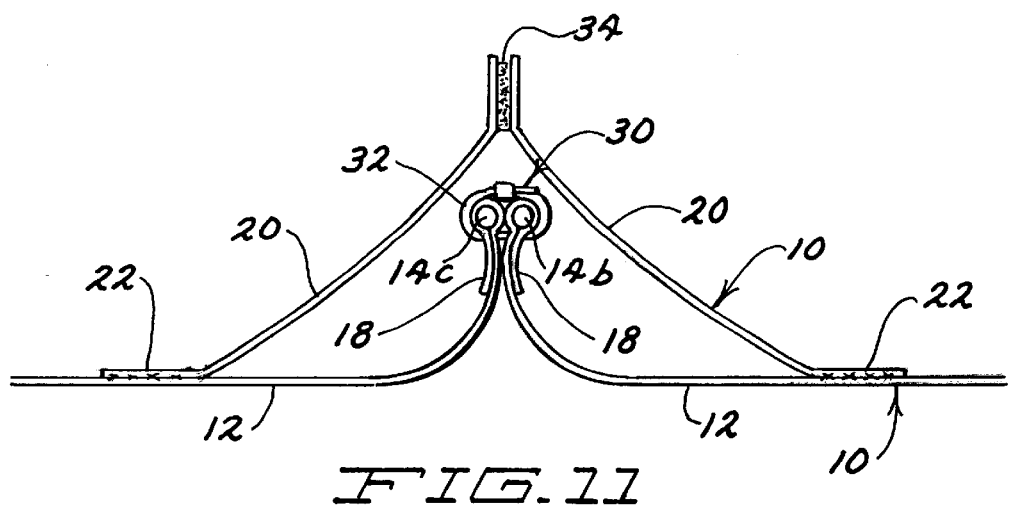
FIG. 11 is a side elevational view of a preferred embodiment of a union of the present invention.

Referring now to FIGS. 9–11, there are shown two embodiments of preferred unions 30 of two sheets 10. Two sheets 10 are arranged so that the side cord 14b of one sheet 10 is substantially parallel and in relatively close juxtaposition with the side cord 14c of the second sheet 10. A plurality of ties 32 are placed around cords 14b and 14c by puncturing the respective edge seams 18 of sheets 10, thereby allowing ties 32 to pass under and around side cords 14b and 14c. The ties are secured so that sheets 10 are now joined. A plurality of sheets 10 may be joined together in the aforesaid manner to form an on-site cover 8 suitable for covering a body of granular material.

FIGS. 9 and 10 illustrate one embodiment of a weather resistant seal over joints or unions 30. In this embodiment, sheets 10 have a side flap 20 proximate only one side edge 28 as shown in FIG. 1A. To provide a weather resistant seal over union 30, the side flap 20 of one sheet 10 is pulled over union 30 and applied to the base material 12 of the adjacent sheet 10 and held in place with adhesive 34. Adhesive 34 can be any adhesive capable of withstanding various weather conditions. Preferably, adhesive 34 comprises a thick, tacky butyl rubber compound.

FIG. 11 shows a preferred embodiment of the use of side flaps 20. As shown in FIG. 1A, each sheet 10 comprises two side flaps 20 proximate respective side cords 14b and 14c, one of which has an adhesive strip 34 attached thereto. Once side cords 14b and 14c are tied together using ties 32, thereby creating union 30, the adjacent side flaps 20 are pressed together such that adhesive 34 creates a seal therebetween.

It is envisioned that there may be instances when using a plurality of prefabricated sheets 10 of predetermined sizes and having side cords 14b and 14c might not be feasible. For example, a system 8 created by forming unions 30 between sheets 10 using side cords 14b and 14c might result in a system 8 which is not suitably shaped to cover a pile having unusual dimensions. In such instances it may be desirable to create alternative unions, such as those shown in FIGS. 12a through 15c. These are created using stitched seams 44 and can be formed using portable equipment in the field.

Figure 12A:
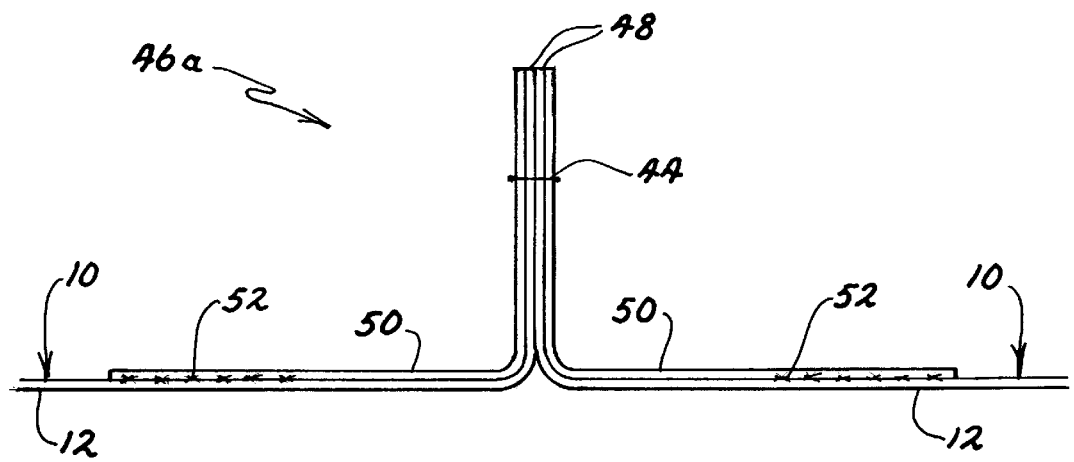
FIGS. 12A–15C are side elevational views of alternative embodiments of cover segment unions.
Figure 12B:
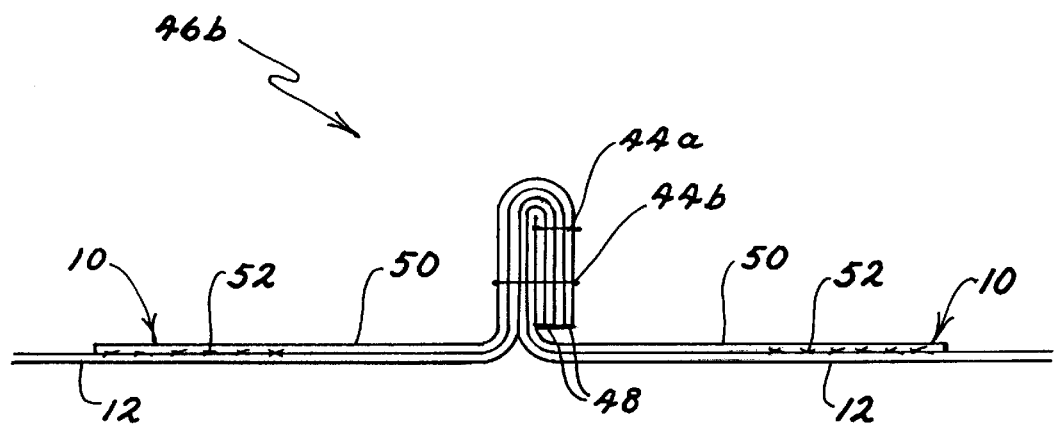
Figure 12C:
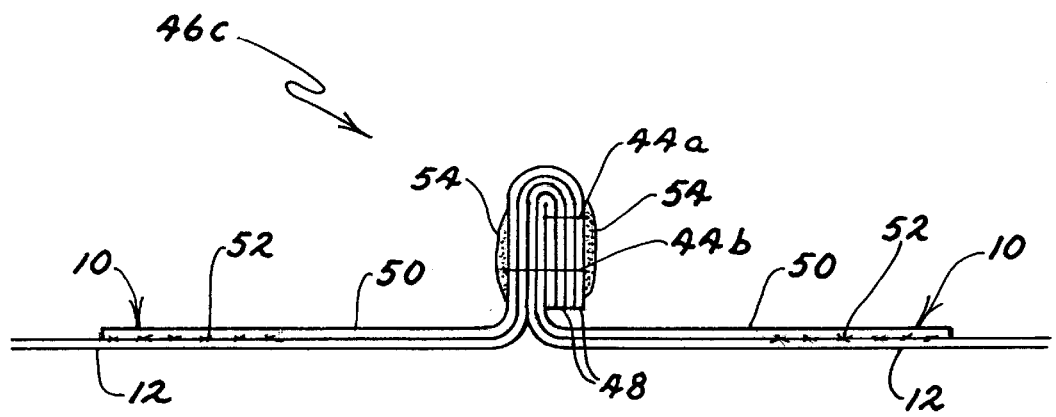

FIGS. 12a through 12c show three embodiments of a sewn union 46, namely 46a, 46b, and 46c, respectively. FIG. 12a depicts a union 46a comprising two edges 48 of the base material 12 of adjacent sheets 10 turned upwardly toward each other. Additionally, a reinforcing strip 50 has been heat welded to base material 12 on either sheet 10 to form seams 52. Strips 50 follow base 12 upwardly, thereby causing resulting union 46a to be four layers thick. These four layers are then sewn together with a single stitched seam 44.

Union 46b is constructed the same way as union 46a with additional steps. It can be seen from FIG. 12b that after completing the union 46 shown in FIG. 12a, and applying a first stitched seam 44a, the four layers of material 12 are folded back down against themselves, forming eight layers of material, and a second stitched seam 44b is applied through all eight layers.

Union 46c takes union 46b one step further by applying sealant 54 to both sides of stitched seams 44a and 44b.

Figure 13A:
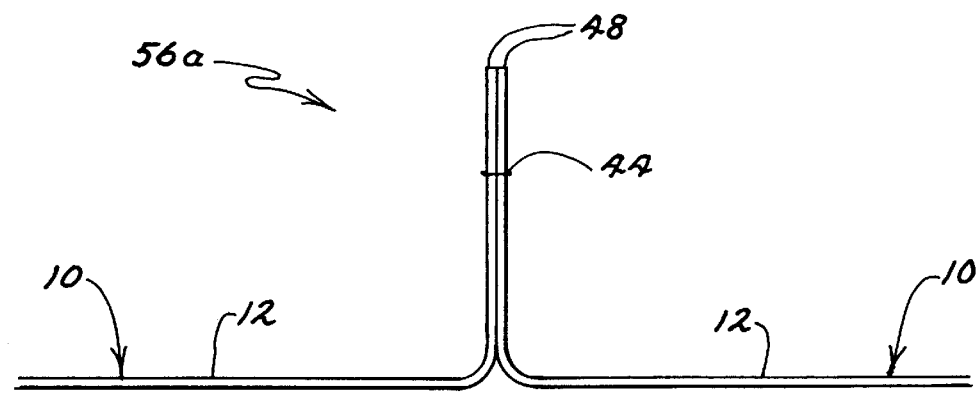
Figure 13B:
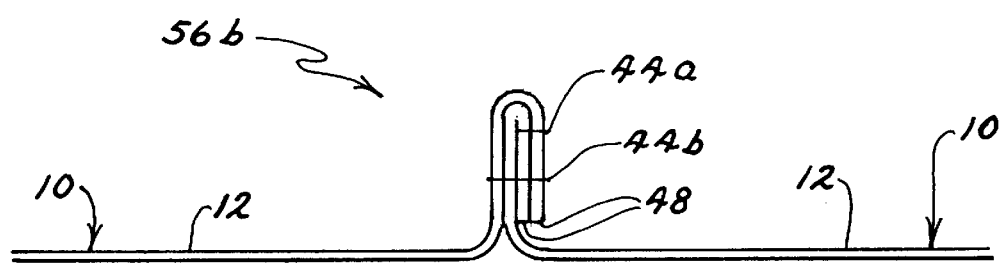
Figure 13C:
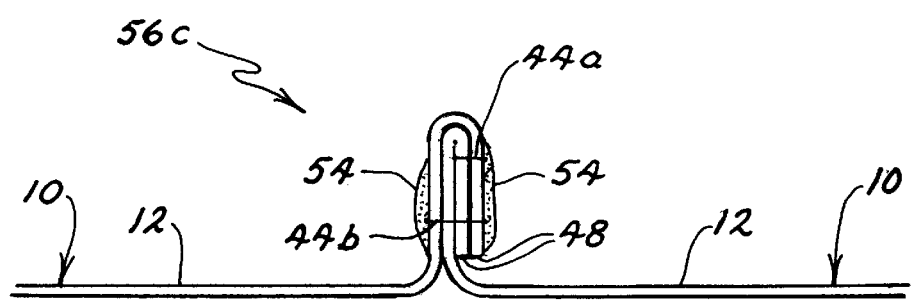

Referring now to FIGS. 13a–13c, there are shown three embodiments of an alternative sewn union 56. These unions are similar to those shown in FIGS. 12a–12c except that reinforcing strips have not been added. Union 56a, shown in FIG. 13a, comprises two edges 48 of the base material 12 of adjacent sheets 10 turned upwardly toward each other. A single stitched seam 44 holds them together.

Union 56b is constructed the same way as union 56a with additional steps. It can be seen from FIG. 13b that after completing the union 56a, the two layers of material 12 are folded back down against themselves, forming four layers of material, and a second stitched seam 44b is applied through all four layers.

Union 56c takes union 56b one step further by applying sealant 54 to both sides of stitched seams 44a and 44b.

Figure 14A:
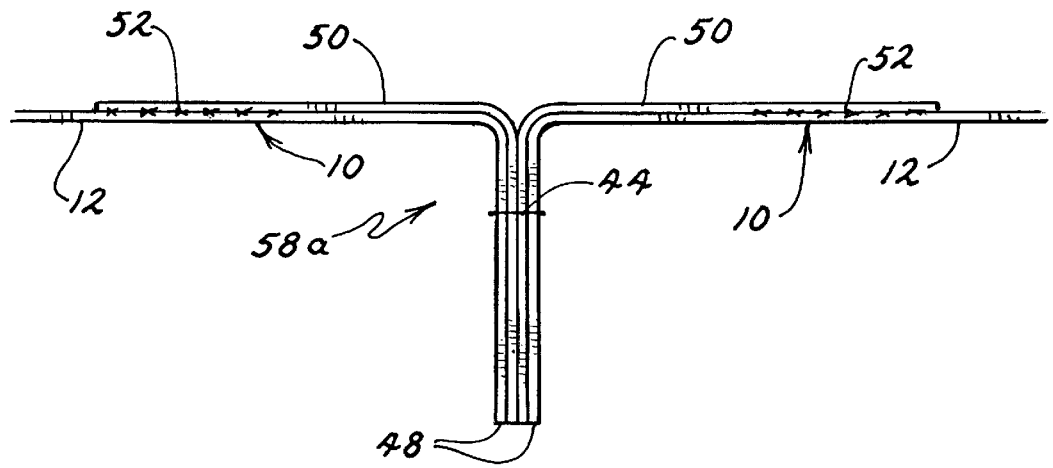
Figure 14B:
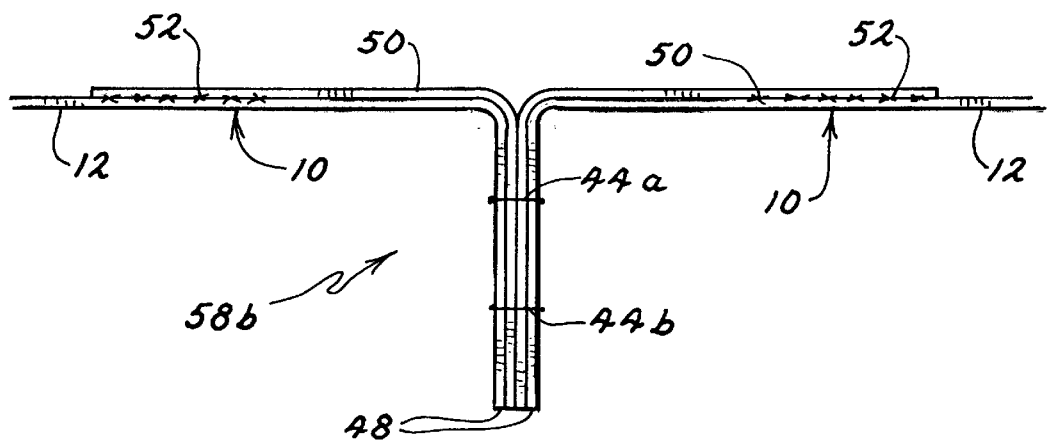
Figure 14C:
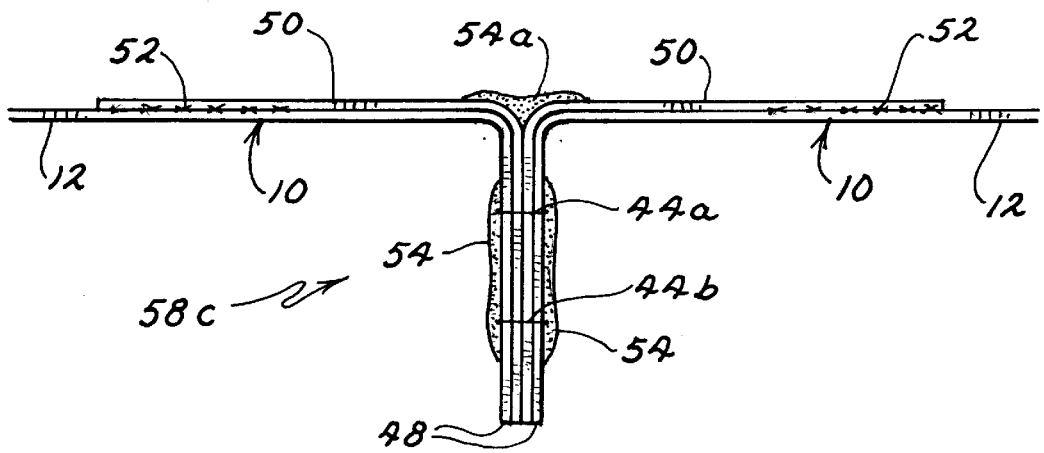

FIGS. 14a–c show three embodiments of another alternative sewn union 58. FIG. 14a depicts union 58a which comprises two edges 48 of the base material 12 of adjacent sheets 10 turned downwardly toward each other. Additionally, a reinforcing strip 50 has been heat welded to the top of the base material 12 on either sheet 10 to form seams 52. Strips 50 follow base 12 downwardly, thereby causing resulting union 58a to be four layers thick, wherein strips 50 form the inner two layers. These four layers are then sewn together with a single stitched seam 44.

Union 58b, shown in FIG. 14b, is constructed the same way as union 58a except that two stitched seams are used, 44a and 44b. Likewise, as shown in FIG. 14c, union 58c is constructed like union 58b with the addition of sealant 54 placed over stitched seams 44a and 44b. Sealant 54a is also placed over: the V-junction at the top center of union or joint 58b in order to prevent water from flowing down between the sheet layers.

Figure 15A:
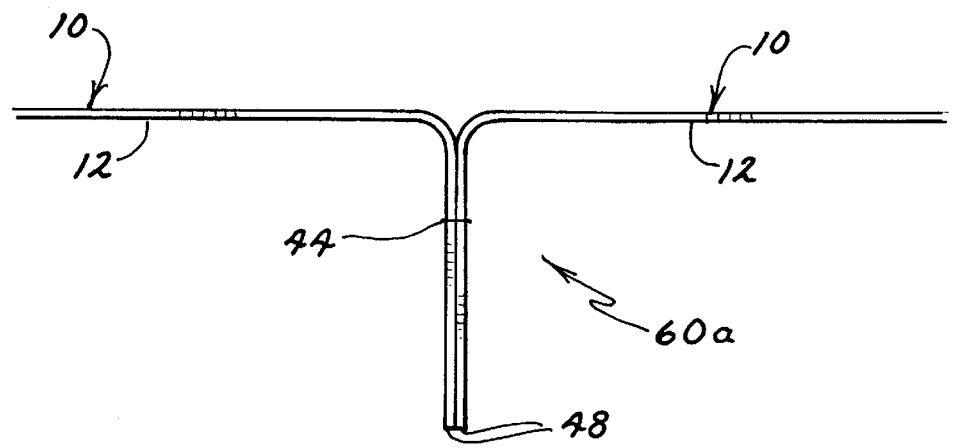
Figure 15B:
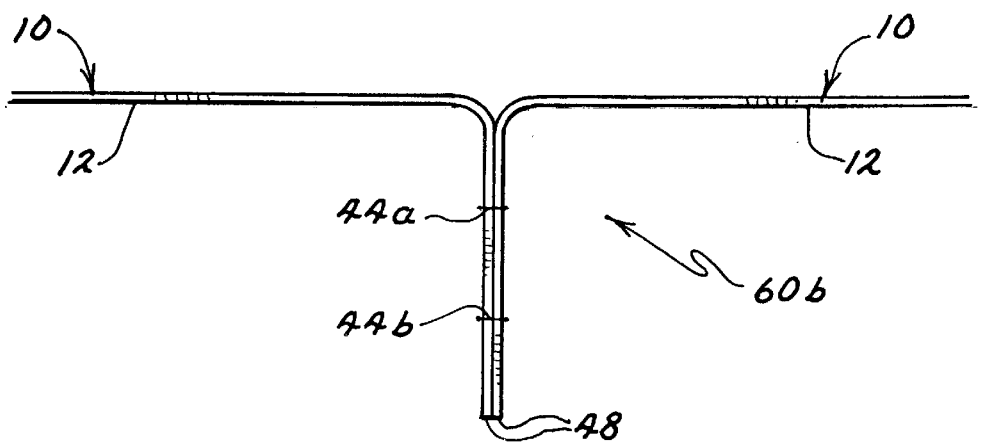
Figure 15C:
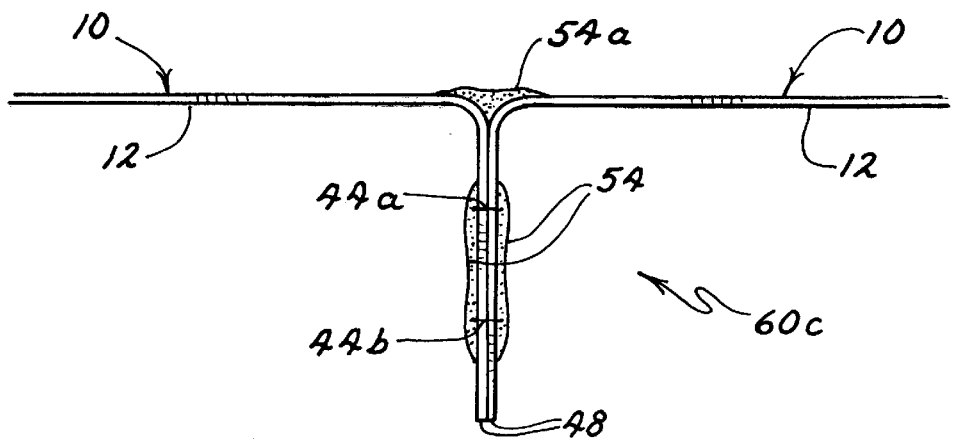

FIGS. 15a–c show unions 60a–c which are similar to unions 58a–c except that reinforcing strips 50 have not been applied. FIG. 15a depicts union 60a which comprises two edges 48 of the base material 12 of adjacent sheets 10 turned downwardly toward each other, thereby causing resulting union 60a to be two layers thick. These two layers are then sewn together with a single stitched seam 44.

Union 60b, shown in FIG. 15b, is constructed the same way as union 60a except that two stitched seams are used, 44a and 44b. Likewise, as shown in FIG. 15c, union 60c is constructed like union 60b with the addition of sealant 54 placed over stitched seams 44a and 44b as well as over the top V-junction.

FIG. 1 and FIGS. 16–20 show how sheets 10 can be used to build various covering systems 8 for different applications. FIG. 1 shows a covering system 8, comprising a plurality of sheets 10, for covering large piles of minerals, grains, or other commodities. System 8 is being held down with ballast bags 40 tied around reinforcing cords 14a.

Figure 16:
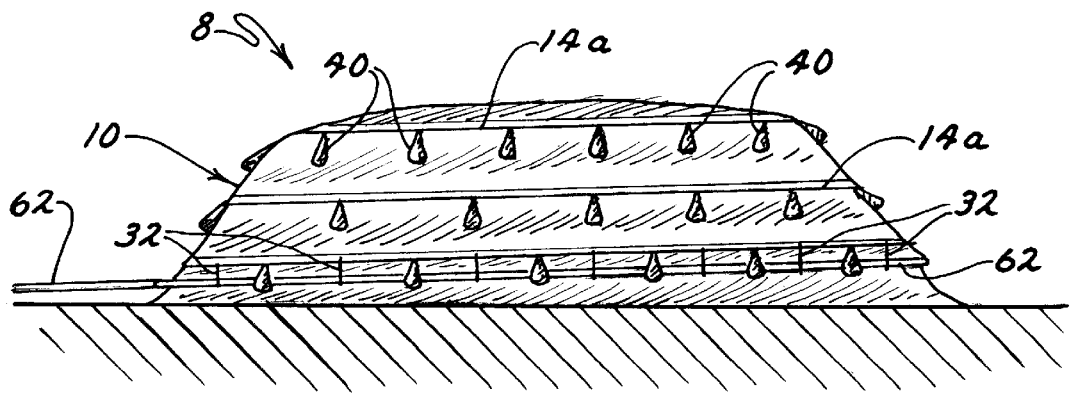
FIG. 16 is a side elevational view of an embodiment of the present invention in use covering a pile.
Figure 17:
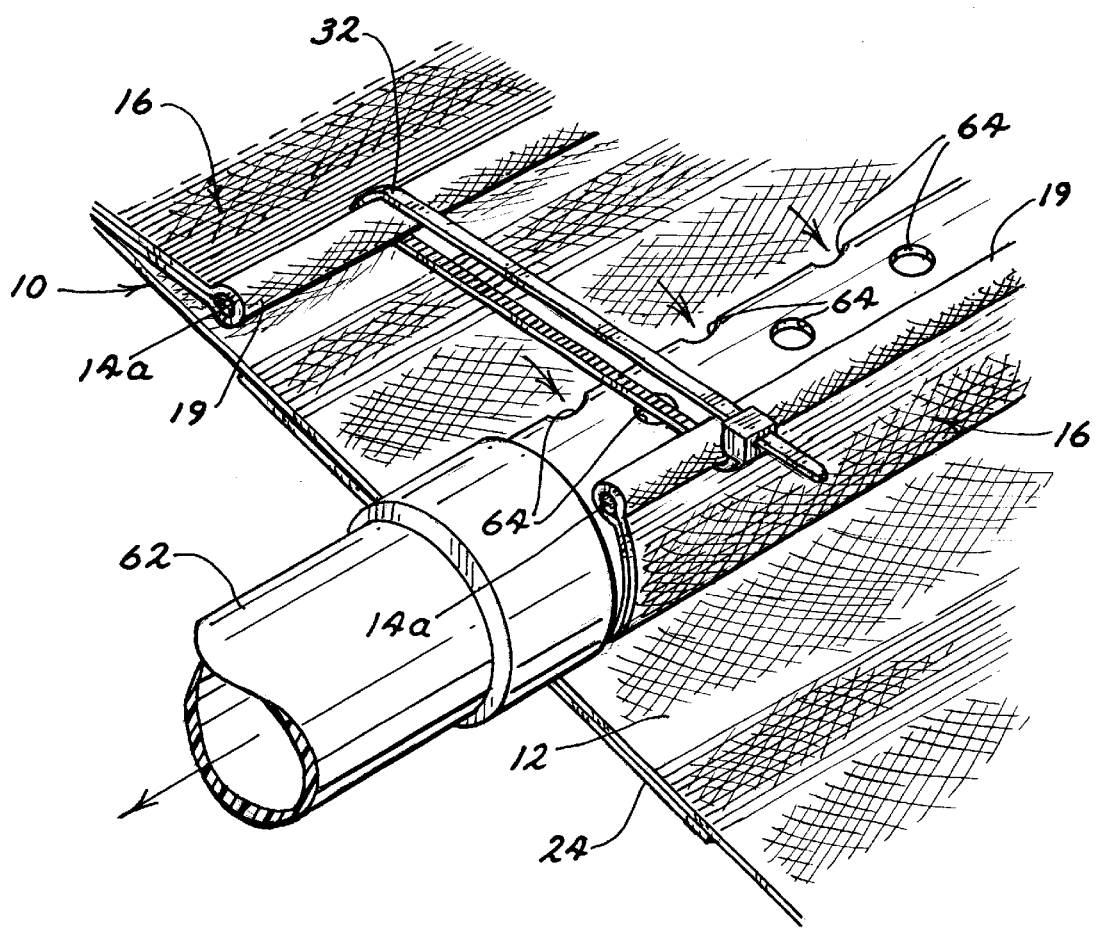
FIG. 17 is a detailed perspective view showing the use for the present invention in providing a fluid collection and drainage conduit.

FIGS. 16 and 17 show a similar system 8 used to cover a pile. In addition to using reinforcing cords 14a to provide attachment points for ballast bags 40, at least one reinforcing cord 14a, along with its prayer seam 16 is being used to support a drainage pipe 62 defining a plurality of holes 64 to allow the ingress of rainwater into pipe 62. For this purpose the prayer seam width 17 (FIG. 1A) may be twelve inches or greater. A friction, plastic tie 32, of the same type used with the sheet joints 30 of FIGS. 9–11, may be used as shown in FIG. 17 to secure one prayer fold seam to the cord 14a of a prayer seam above, thereby holding the lower prayer seam in the upwardly turned position shown to support drainage pipe 62.

FIG. 18 illustrates how the cover system of this invention may be effectively utilized to enclose a contaminated body of liquid. Chemicals and toxic wastes are sometimes collected in ponds, and a problem exists with respect to rain water entering such contaminated ponds and causing polluted runoff into the surrounding soil.

Figure 2:
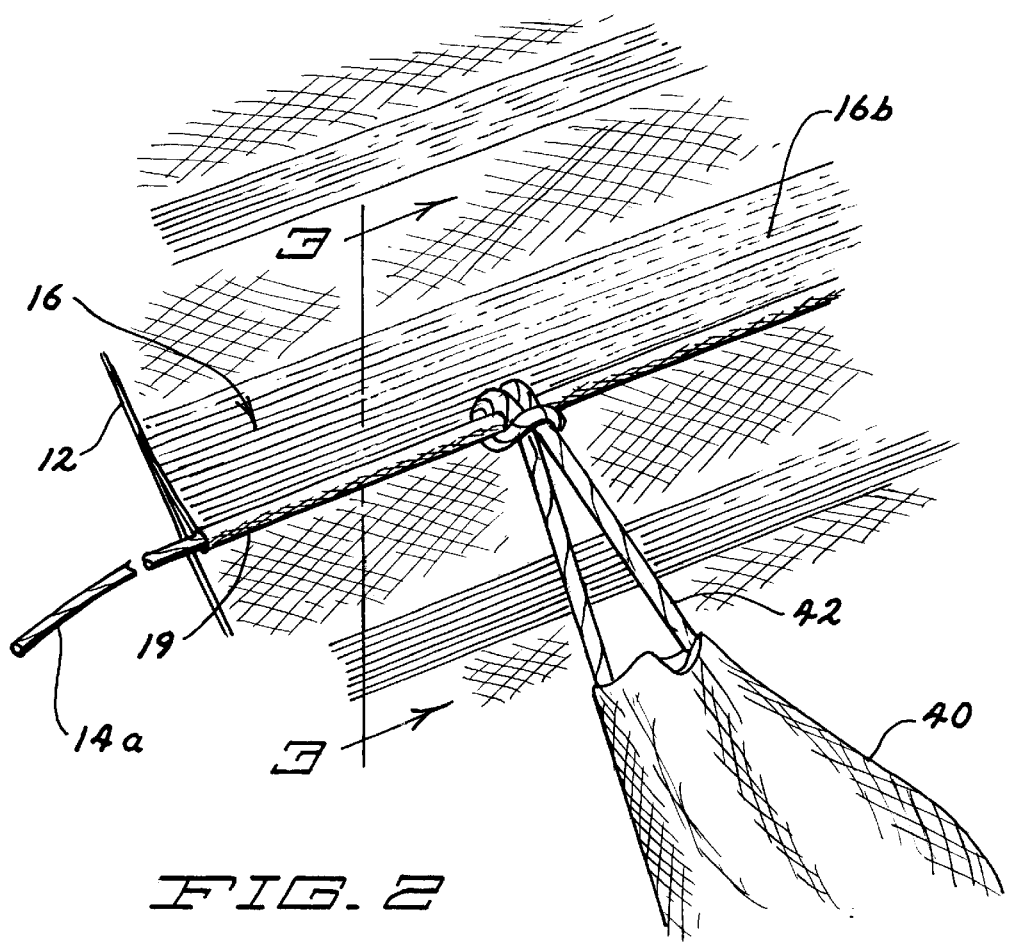
FIG. 2 is a perspective view of a preferred application of a reinforcing cord of the present invention being used to support a ballast bag.

In the embodiment shown in FIG. 18, a cover system 8A of the type disclosed with respect to the preceding embodiments may be suspended on upright posts 66, with the top of the cover inclined as shown to permit the gravity runoff of rainwater. The cover system 8A is shown erected over a collection pond 67 containing contaminated liquid 69. A moat or channel is created around the pond periphery using, for example, molded concrete curbing members 68 having a concave upper face 69 as shown to define a moat or channel for collecting water runoff from the cover 8a. Channel members 68 may advantageously have drainage outlets 70 to direct rainwater away from the collection pond as indicated by the direction arrow in FIG. 18. Eye bolts 72 are provided in the concrete collection members 72 around its inner periphery to tie the cover down tightly over support posts 68 such that the bottom edge of the cover drains into the channel 69. For this purpose, freely extending end segments of reinforcing ropes or cords 14, as illustrated in FIG. 2, may be tied to eye bolts 72. It is contemplated that the cover systems of this invention will be provided with such freely extending end segments on reinforcing cords 14 as appropriate for the application for attachment to anchoring devices of various kinds, such as ground anchors, walls and other existing support structures.

It is anticipated that the disclosed cover system may also be used in a horizontally disposed position, lying substantially flat over the top of a contaminated liquid collection pond. In such an application, freely extending loose ends of the reinforcing cords 14, as illustrated with respect to 14a in FIG. 2, may be secured to ground anchors in the form of posts or other solid anchoring devices. With the opposite ends of each reinforcing cord tightly secured to such posts beyond the opposed peripheral edges of the cover system 8 of the type described with respect to FIGS. 1, 1A and 2, the cords 14 will be drawn taut in tension. This will cause the respective prayer fold seams 16 to stand upright, for example, in the manner of the prayer seam illustrated in FIG.

6. Adjacent, upright prayer seam folds will thus define collection troughs for rainwater, which may be directed to the surrounding ground, away from the collection pond.

FIGS. 19 and 20 illustrate the application of the cover system of this invention to an open-topped transport carriage, such as a railroad hopper car or a truck trailer having side walls but no fixed cover. In the embodiment shown in FIG. 19, a cover system 8B of the type disclosed herein is shown attached over the vertical side walls of a railroad hopper car 74. The hopper car is shown as provided with attachment brackets 76 along the bottom of the side walls thereof. The cover system is the same as described above, with the reinforcing cords 14 running horizontally as shown. The only change to the cover system is in the addition of webbed handles 78 stitched to the lower periphery of the cover sheets 10, preferably on the inside surface thereof. Separate tie-down ropes 80 are shown in use in the application of FIGS. 19 and 20 to secure the cover 8B in place. Those tie-down ropes extend vertically over the cover and over the top of the hopper car and are grouped around railroad car brackets 76 and tied to webbed handles 78 on the cover as illustrated in FIG. 20. FIG. 20 is intended to show the surface of one of the cover sheets 10, with webbed handle 78 stitched thereto. With this arrangement, the moisture impervious cover system 8B can be utilized to effectively cover material being carried in open hopper cars and truck trailers.

The use of ballast bags 40 as illustrated in FIGS. 1 and 2 provides a base seal around the lower periphery of the cover system 8. The cover system may also be used with a retention type of system, in which case ballast bags may not be required. In such a so-called retention type of system, freely extending ends of the reinforcing cords 14 are utilized to tie down the peripheral bottom edges of the cover 8 to ground anchors, such as posts. In either case, a base seal such as accomplished by sand, crushed rock or gravel applied to the peripheral edge skirt of a cover as on conventional systems can be eliminated with most typical installations.

The use of reinforcing cords 14, tightly encapsulated within prayer seams effectively increases the load stresses which can be carried by the cover system by transferring those stress loads from the cover fabric to the cords. When used in combination with the choker strips 24, the stresses on the prayer seams for the cords are reoriented or redirected from a peeling direction to a shear direction as applied against the lap seams formed by the attachment of the choker strips to the face of the cover sheets. In this manner, the strength of the overall system can be increased to equal or exceed the strength of the main body of the cover itself.

The aforesaid stress relief on the cover system permits the use of lighter weight materials of different warp, weft tensile and tear sheet strengths, such as films and unreinforced plastic sheets, which would not otherwise be possible on high load systems. This results in lower overall cost of the entire cover system because of the lower cost of such lighter weight materials.

The cover system disclosed herein can be hung or suspended, tied down, ballasted, tensioned from the top, bottom, or sides to accomplish any method of restraining or supporting the cover system. The cover system can also be pressurized on one side so as to create a slope to allow for the drainage, retention or redirection of liquids or fluid materials into a controlled location for disposal or relocation. The cover system can also be negatively or positively pressurized on one side so as to allow for control and redirection of air into and out of a commodity pile. This is particularly important for the storage of agricultural commodities.

As described herein, the cover system of this invention provides a moisture-proof cover. That is primarily accomplished by using heat welded joints for all manufactured seams as described above with respect to the prayer seams 16 in which reinforcing cords 14 are tightly secured. The flaps 20 may be secured over the field joints 30 between multiple cover segments 10, as described in FIGS. 9–11 to ensure a totally moisture-proof covering system.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the spirit and scope of the invention as defined by the claims.

What is claimed is:

1. A commodity cover comprising:
   a flexible sheet material of a predetermined size having opposed faces and defining a covering;
   a plurality of elongated sleeves formed on the sheet material, said sleeves being generally parallel to each other and spaced apart a predetermined distance; and
   a flexible rope member tightly encapsulated within each of said sleeves.

2. The cover of claim 1 wherein:
   the sleeves are formed by bunching the sheet material together at spaced locations thereon to form two sheet material sections which are joined together face-to-face in a tight seal so as to define an elongated sleeve at one end of said sections within which a rope member is securely contained in outwardly spaced relation from one face of the sheet material.

3. The cover of claim 1 wherein:
   the flexible sheet material is thermally reactive and the two sheet material sections are fused together by thermal welding to form a fluid impervious seam.

4. The cover of claim 3 wherein:
   the sheet material is coated or laminated, reinforced polyolefin or nylon.

5. The cover of claim 1 wherein:
   one or more of said flexible rope members have end segments which extend freely beyond peripheral edges of the cover for use in securing the cover to anchoring devices.

6. The cover of claim 2 and further including:
   a plurality of elongated choker strips of flexible material sealingly positioned on the opposite face of the sheet material and sealingly attached thereto on opposite sides of each of the bunched sections, with said choker strips being disposed in opposed relation to the rope members generally parallel thereto.

7. The cover of claim 6 wherein:
   the choker strips are heat sealed to the opposite face of the sheet material.

8. A sheet for use in building a flexible, weather barrier system, the sheet comprising:
   a flexible, waterproof base having a predetermined width;
   a plurality of elongated flexible cords folded into said base and secured therein between adjoining sections of said base, welded together to form a plurality of prayer seams and elongated cavities within which said cords are fixed relative to said base at spaced apart locations thereon; and a plurality of choker strips welded over said prayer seams on the opposite side of the base from the cords such that lap seams are formed on either side of said prayer seam and run substantially parallel thereto, whereby stresses on the prayer seams are reoriented from a peeling action to a shearing action on the lap seams.

9. A weather barrier covering system for protecting large quantities of solids or liquids, the system comprising:

a plurality of sheets secured together to form a cover over material to be protected, each of said sheets comprising:
- a flexible base material having two side edges and a predetermined width;
- a plurality of flexible cords of predetermined length folded into said base material and thermally welded therein, thereby forming prayer seams on one side of the base material, and such that said cords are encapsulated and fixed relative to said base material;
- a plurality of choker strips welded over said prayer seams onto the opposite side of the base material such that lap seams are formed on either side of said prayer seam and run substantially parallel thereto; and
- a plurality of weighted ballast bags secured to said flexible cords and hung therefrom to restrain the covering system.

10. The weather barrier system of claim 9 wherein:
the ballast bags are secured to the cords by flexible ties extended around the cords through holes formed in the folded sheet material of the prayer seams.

11. The weather barrier system of claim 9 wherein:
one or more of the flexible cords have end segments extendingly freely beyond perimeter edges of the cover for attachment to anchoring devices to retain the cover in place.

12. A weather barrier cover system for protecting large quantities of solids or liquids, the system comprising:

a plurality of sheets, each of said sheets comprising:
- a flexible base material having two side edges and a predetermined width;
- a side cord folded into the base material, proximate each of said side edges, and welded therein to form edge seams;

sheet joints joining each of said sheets together to form said cover system, the sheet joints comprising:
- a substantially parallel arrangement of two side cords from adjacent sheets in relatively close juxtaposition; and
- a plurality of ties passing around both of said juxtaposed cords and through the respective edge seams fixing said cords to their respective sheets, the ties binding said cords together and the ties spaced a predetermined distance from each other to provide binding support along the length of said cords.

13. The weather barrier cover system of claim 12, wherein each of said sheets further comprise:

an edge flap proximate at least one of said side cords and thermally welded to the base material adjacent to one of the edge seams to form a lap seam extending parallel to said edge seam, the edge flap having a free edge which is extended over the sheet joint of the sheet material of an adjoining sheet and secured thereto in a waterproof seal with the edge flap disposed over the sheet joint in weather protective, covering relation thereto.

14. The weather barrier cover system of claim 13 wherein:
the edge flaps are secured to adjoining sheet material by adhesive.

15. The weather barrier cover system of claim 12, and each of said sheets further comprising:
- an edge flap thermally welded to the base material adjacent to one of the edge seams to form a lap seam extending parallel to said edge seam, the edge flap having a free edge; and
- the free edges of the edge flaps of adjacent sheets being sealed together over the sheet joints in weatherproof, covering relation to the sheet joints.

16. The weather barrier cover system of claim 15 wherein:
the edge flaps of adjacent sheets are joined together by adhesive.

17. The weather barrier cover system of claim 12, and each of said sheets further including:
- a plurality of flexible cords of predetermined length folded in to the base material and tightly secured therein between adjoining sections of the base material thermally welded together to form a plurality of prayer seams within which the cords are encapsulated and fixed relative to the base material at parallel, spaced apart locations thereon; and
- a plurality of choker strips thermally welded to the base material such that lap seams are formed on either side of the prayer seams and extend substantially parallel thereto, whereby peeling stresses on the prayer seams are transferred to shearing stresses on the lap seams.

18. The weather barrier system of claim 17, and further including:
- a plurality of weighted ballast bags secured to said flexible cords and hung therefrom to restrain the covering system against air forces.

19. A method of making a multipurpose, flexible weather barrier system comprising:

placing a flexible, rope-like cord on a sheet of synthetic, waterproof material, thereby dividing said sheet into a first sheet section and a second sheet section;

folding said sheet around said cord so that said first sheet section meets and faces said second sheet section, forming a junction of said sections joining said first sheet section to said second sheet section, proximate said cord, thereby forming a prayer seam parallel to said cord and defining a cavity which tightly encapsulates said cord within said material;

separating said first section from said second section, so that said cord and said seam are located on a first side of said material and said junction of said sheet sections is located on a second side of said material, opposite said first side;

covering the junction of said sections with an elongate choker, having a predetermined width, so that said choker runs parallel with said junction;

sealingly securing said choker to said second side of said material on opposite sides of said junction, thereby forming lap seams between said choker and said material on both sheet sections.

* * * * *